United States Patent [19]
Ginzel et al.

[11] Patent Number: 5,347,260
[45] Date of Patent: Sep. 13, 1994

[54] METHOD AND APPARATUS FOR RECEIVING DATA

[75] Inventors: Geoffrey D. Ginzel, Peoria; Ricky D. Vance, Washington, both of Ill.

[73] Assignee: Caterpillar Inc., Peoria, Ill.

[21] Appl. No.: 161,431

[22] Filed: Dec. 6, 1993

Related U.S. Application Data

[63] Continuation of Ser. No. 945,464, Sep. 16, 1992, abandoned.

[51] Int. Cl.$^5$ ............................................. B60Q 1/00
[52] U.S. Cl. ................................. 340/438; 340/459; 340/461; 340/525; 364/141; 364/146
[58] Field of Search ............... 340/438, 459, 461, 517, 340/525, 520, 521; 364/141, 146, 188

[56] References Cited

U.S. PATENT DOCUMENTS

| | | | |
|---|---|---|---|
| 3,516,063 | 6/1970 | Arkin et al. | 340/163 |
| 3,866,166 | 2/1975 | Kerscher, III et al. | 340/462 |
| 3,906,437 | 9/1975 | Brandwein et al. | |
| 3,964,302 | 6/1976 | Gordon et al. | 73/117.3 |
| 4,197,650 | 4/1980 | Bailey et al. | 33/143 L |
| 4,223,302 | 9/1980 | Hocking | 340/525 |
| 4,258,421 | 3/1981 | Juhasz et al. | 364/424 |
| 4,376,298 | 3/1983 | Sokol et al. | 364/551 |
| 4,497,057 | 1/1985 | Kato et al. | 371/29 |
| 4,630,043 | 12/1986 | Haubner et al. | 340/825.57 |
| 4,688,029 | 8/1987 | Kawasaki et al. | 340/754 |
| 4,748,843 | 6/1988 | Schafer et al. | 73/117.3 |
| 4,804,937 | 2/1989 | Barbiaux et al. | 340/525 |
| 4,809,177 | 2/1989 | Windle et al. | 364/424.01 |
| 4,815,824 | 3/1989 | Sharples | 350/336 |
| 4,817,040 | 3/1989 | Bodley-Scott | 364/424.04 |
| 4,862,395 | 8/1989 | Fey et al. | 364/561 |
| 4,926,331 | 5/1990 | Windle et al. | 364/424.04 |
| 4,939,652 | 7/1990 | Steiner | 364/424.04 |
| 4,967,143 | 10/1990 | Raviglione et al. | 324/73.1 |
| 4,975,848 | 12/1990 | Abe et al. | 364/424.03 |
| 4,977,389 | 12/1990 | Shiraishi | 340/461 |
| 5,034,889 | 7/1991 | Abe | 364/424.04 |
| 5,041,980 | 8/1991 | Maddock et al. | 364/431.03 |
| 5,050,080 | 9/1991 | Abe | 364/424.04 |
| 5,091,858 | 2/1992 | Paielli | 364/431.12 |
| 5,150,609 | 9/1992 | Ebner et al. | 73/117.3 |
| 5,157,610 | 10/1992 | Asano et al. | 364/424.03 |
| 5,214,582 | 5/1993 | Gray | 364/424.03 |
| 5,257,190 | 10/1993 | Crane | 364/424.03 |

FOREIGN PATENT DOCUMENTS

3837592A1 5/1990 Fed. Rep. of Germany.
WO92/04693 3/1992 PCT Int'l Appl..

Primary Examiner—Donnie L. Crosland
Attorney, Agent, or Firm—Steven R. Janda

[57] ABSTRACT

Instruments, for example diagnostic and monitoring systems, are often used in connection with electronic controls having a limited number of inputs. Advantageously, data from a plurality of sensors is received by the instrument and transferred to the electronic control via a communication link. In accordance with the invention, a plurality of sensors produce signals in response to sensed parameters. The instrument, having one or more displays, receives the sensor signals and responsively produces an instrument signal. A control receives the instrument signal and responsively produces a control signal. The displays indicate parameter values in response to the control signal.

9 Claims, 4 Drawing Sheets

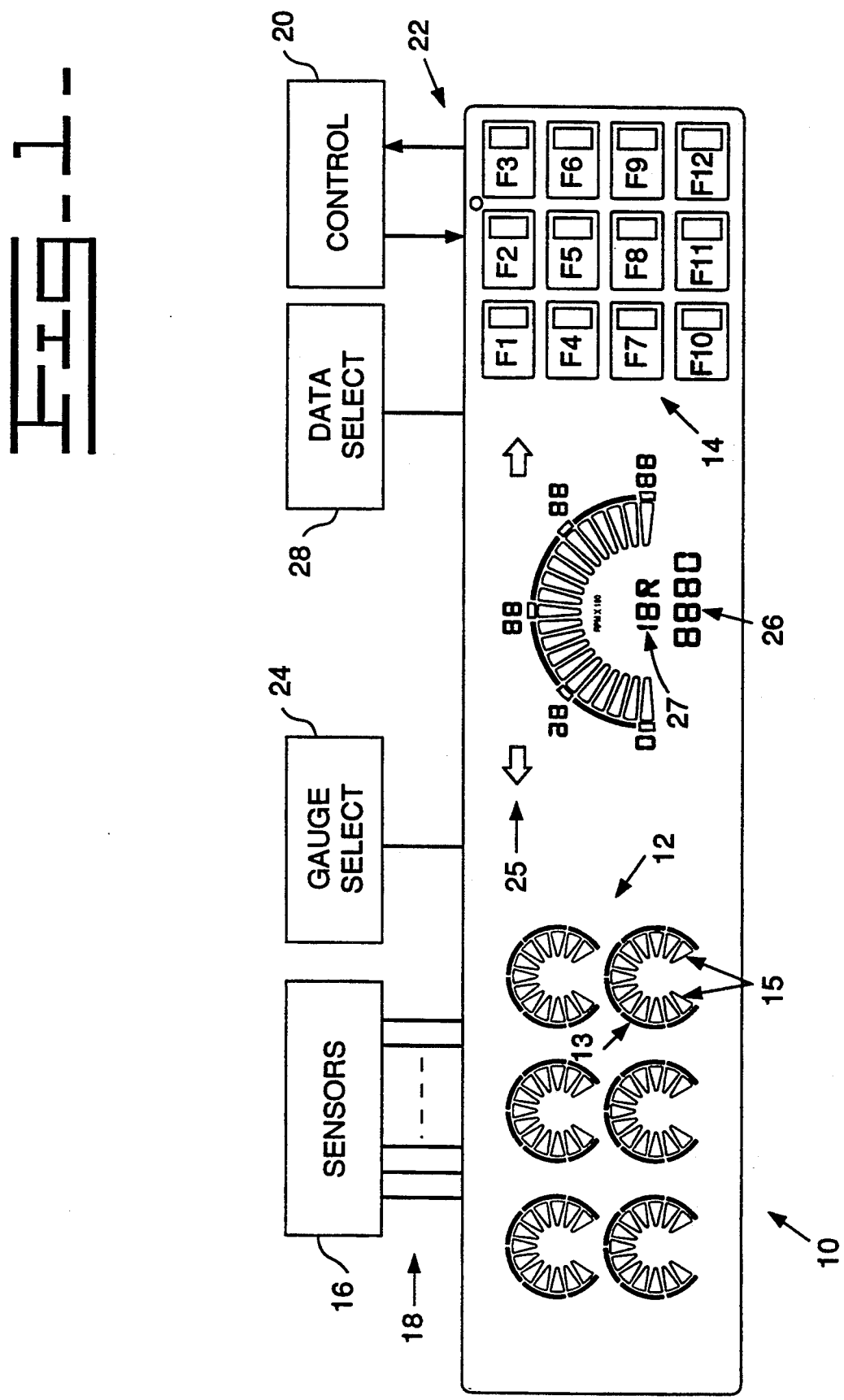

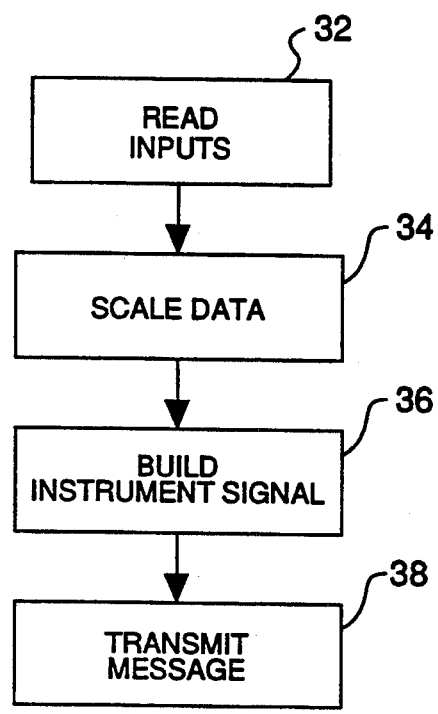
Fig_2_

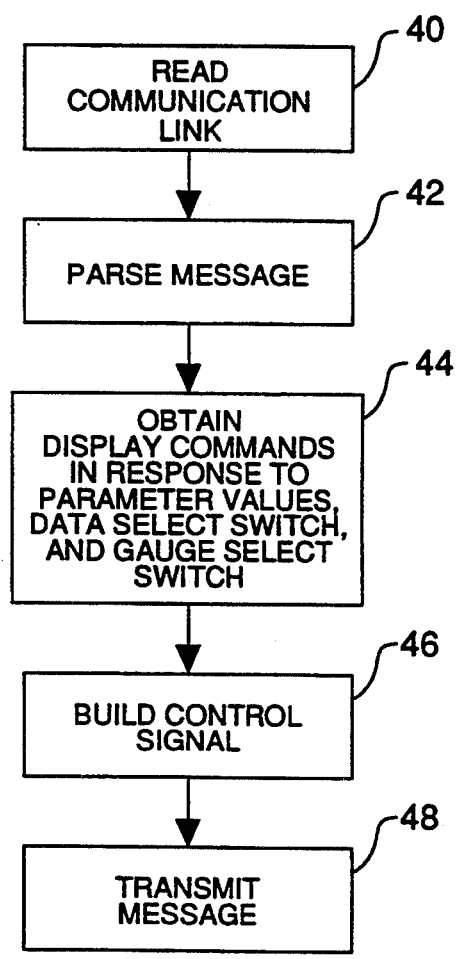

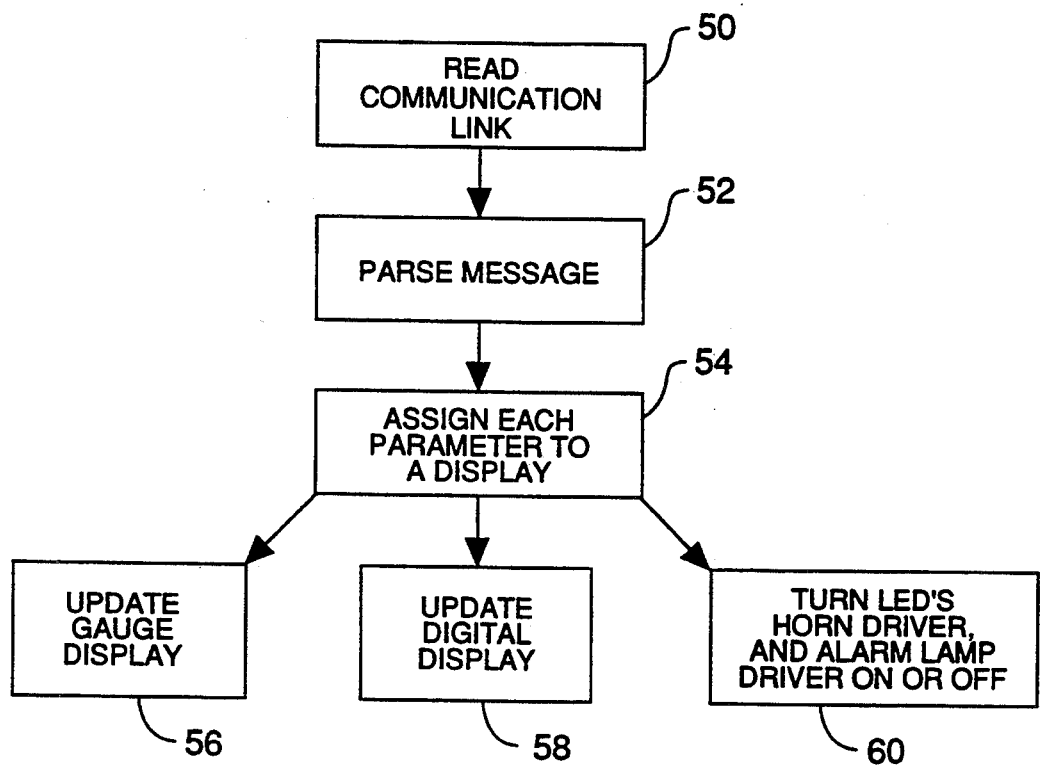
Fig-4-

METHOD AND APPARATUS FOR RECEIVING DATA

This is a continuation of application Ser. No. 07/945,464, filed Sep. 16, 1992, now abandoned.

TECHNICAL FIELD

The invention relates generally to receiving data from a plurality of sensors and, more particularly, to a method and apparatus for delivering sensor signals to an electronic control via an instrument display and displaying a plurality of parameter values.

BACKGROUND ART

In a variety of machines, particularly engine-powered vehicles, instruments are employed to detect the presence of various undesirable operating conditions, such as overheating of the engine, low oil pressure, low fuel, and the like, and indicators are provided to warn the operator of such conditions. These instruments are often designed to operate in connection with a variety of machine types and are connected to various sensors and switches via a wire harness and/or a communication link. In many applications, these instruments are also connected to electronic control systems such as electronic engine controls, electronic transmission controls, and the like.

The functionality of these electronic controls can only be significantly increased by adding more sensors, and consequently more sensor inputs, to increase the amount of information to be acted upon by the electronic control. The number of sensor inputs, however, is typically limited by the number of wire harness connector pins. To further increase the functionality of the electronic control is therefore limited by the number of wire harness connector pins. The number of inputs can sometimes be increased by adding additional wire harness connectors, however, these connectors are bulky and expensive. It is therefore advantageous to provide additional information to the electronic control while not increasing the number of harness connector pins required.

Since the instrument for displaying information may be used in connection with many different machines, it is advantageous for the instruments to be as flexible as possible. Lower costs will be achieved and less warehousing space will be required if a single instrument is manufactured which can be used in many different applications and in connection with many different electronic controls.

These instruments also have a limited number of displays for indicating parameter levels. To increase the amount of data displayed usually requires an increased number of displays. While feasible in some applications, the addition of more displays is often prohibitively expensive and is limited by space availability. It is therefore advantageous to increase the amount of information that may be indicated by any given display.

In some cases it is also advantageous to display in digital form a number representative of the level of a parameter in engineering units. This may be important for sensor diagnostic purposes or to more precisely monitor a parameter.

The present invention is directed to overcoming one or more of the problems set forth above.

Disclosure of the Invention

The invention avoids the disadvantages of known instruments for monitoring operating conditions or diagnosing fault conditions and provides an instrument capable of receiving data from sensors and transferring the data to an electronic controller which uses the information to perform control functions and to produce signals to control displays on the instrument representing the level of sensed parameters.

In one aspect of the invention, an apparatus for receiving data and displaying a plurality of parameters is provided. A plurality of sensors produce sensor signals in response to the level of sensed parameters. An instrument having one or more displays receives the sensor signals and responsively produces an instrument signal. A control receives the instrument signal and responsively produces a control signal. A communication link is connected to and between the instrument and the control. The instrument displays the level of the sensed parameters in response to the control signal.

In another aspect of the invention, a method for receiving data and displaying a plurality of parameters is provided. The method includes the steps of producing sensor signals in response to a plurality of sensed parameters; delivering the sensor signals to an instrument having one or more displays and responsively producing an instrument signal; delivering the instrument signal to a control and producing a control signal; and displaying the level of the sensed parameters on said one or more displays in response to the control signal.

The invention also includes other features and advantages which will become apparent from a more detailed study of the drawings and specification.

BRIEF DESCRIPTION OF THE DRAWINGS

For a better understanding of the present invention, reference may be made to the accompanying drawings in which:

FIG. 1 is a diagrammatic illustration of a computerized monitoring system and the interconnection of certain aspects of a preferred embodiment of the present invention; and FIG. 2 is a flow chart of an algorithm used in connection with the instrument in a preferred embodiment of the invention;

FIG. 3 is a flow chart of an algorithm used in connection with the electronic control in a preferred embodiment of the invention; and FIG. 4 is a flow chart of an algorithm used in connection with the instrument in a preferred embodiment of the invention.

Best Mode for Carrying Out the Invention

An instrument for displaying parameter values is shown generally by the reference numeral 10 in FIG. 1. In the preferred embodiment, the instrument 10 is a computerized diagnostic and monitoring system for monitoring and displaying parameters and informing an operator by visible and/or audible indications when a warning condition exists. The instrument 10 advantageously includes a plurality of electronic gauges 12 and indicator lights 14. The gauges 12 preferably indicate the level of a plurality of sensed parameters, for example, engine RPM, oil temperature, fuel level, transmission oil temperature, and the like, and may be used in connection with any of a plurality of different machine types. Warning conditions are brought to an operator's attention by the indicator lights 14 or a flashing gauge 12. In a preferred embodiment, warning conditions of various levels are also indicated by a flashing alarm lamp and/or a horn (neither of which are shown). Advantageously, the indicator lights 14 are lit in response to switch-type inputs being in a warning or fault condition. The instrument 10 is advantageously microprocessor based and functions in response to internal software.

The instrument 10 illustrated in FIG. 1 is sufficiently flexible to be used in connection with a number of different machines and to indicate a number of different parameters. For example, each gauge, except the central gauge indicating speedo/tacho information, is capable of indicating either a high warning condition or a low warning condition. In a preferred embodiment, the gauge 12 includes a plurality of indicating segments 13 located in the central portion of the gauge and a plurality of warning segments 15 including the two most clockwise oriented and the two most counter-clockwise oriented segments for indicating the high and low warning conditions, respectively.

To indicate the level of a parameter having a high warning condition, for example hydraulic oil temperature, the two most clockwise oriented segments are enabled and a high outline segment adjacent the clockwise oriented warning segments 15 is illuminated. The indicating segments 13 are progressively illuminated in the clockwise direction as the sensed parameter increases from a low level to a high warning level. To indicate the level of a parameter having a low warning condition, for example fuel level, the two most counter-clockwise oriented segments are enabled and a low outline segment adjacent the counter-clockwise oriented warning segments 15 is illuminated. The indicating segments 13 are illuminated to indicate the sensed parameter being at a high level and progressively turned off in the counter-clockwise direction as the sensed parameter decreases from the high level to a low warning level.

In the case of the level of the parameter exceeding a high warning value, all of the indicating segments 13 plus either one or two of the clockwise oriented warning segments 15 are caused to flash depending on the degree to which the parameter level exceeds the high warning value. If the level of the sensed parameter decreases below a low warning value, the indicating segments 13 and one or two of the most counter-clockwise oriented warning segments are caused to flash depending on the degree to which the parameter level is below the low warning value.

Advantageously, each machine type has an identification code to be delivered to the instrument which responsively reconfigures itself in response to the layout chosen by the designer of that machine type. In response to the identification code, the instrument 10 determines that the sensor information should be sent to the electronic control 20 via the communication link 22 and also determines the parameter monitored at each input and the signal filtering, debounce, scaling, or averaging characteristics associated with each input.

The instrument 10 is connected to each of a plurality of sensors 16 by wires in a wire harness 18. When used in connection with some machine types, the instrument 10 is also connected to one or more electronic controls 20 via a communication link 22. In the preferred embodiment, the communication link 22 is a two-way serial communication link on which the instrument 10 and electronic control 20 can both transmit and receive information.

A gauge selecting means 24 is connected to the instrument 10 to select the parameter values to be displayed on the plurality of gauges 12. The gauge selecting means 24 is preferably a toggle switch of a type well-known in the art.

In the preferred embodiment, there are a first group and a second group of parameters to be displayed on the gauges 12. However, it should be understood that the invention is not limited to only the first and second groups of parameters.

Gauge selection lights 25 are advantageously provided to indicate which of the first and second groups of parameters are being indicated by the gauges 12. In the preferred embodiment, two gauge selection lights 25 are provided in the form of directional indicators; however, the number and form of the gauge selection lights 25 should in no way limit the scope of the invention.

A digital display 26 is provided for indicating, advantageously in engineering units, the level of a parameter being sensed by one of the sensors 16. The digital display 26 may also indicate a percentage of a reference level of the indicated parameter, for example a maximum or minimum value. An identification display 27 is advantageously disposed adjacent the digital display 26. The identification display 27 indicates which parameter is being displayed in digital form. Preferably, each parameter is associated with a particular numerical identifier to be displayed on the identification display 27 whenever the value of that parameter is displayed on the digital display 26. For example, if the gauges were numbered, the number of the gauge 12 associated with the same parameter being displayed on the digital display 26 would be displayed on the identification display 27. Alternatively, the gauge associated with the parameter displayed on the digital display 26 could be caused to flash.

A data selecting means 28 is connected to the instrument 10 to select the parameter to be indicated on the digital display 26. The data selecting means 28 is preferably a switch of a type well-known in the art. As the data selecting means 28 is activated, the digital display 26 scrolls through each of the sensed parameters. Advantageously, a decal or card (not shown) indicating the parameters associated with each of the gauge selection lights 25 and the numerical identifiers on the identification display 27 is located near the instrument 10 for easy reference by the operator.

Advantageously, a warning indicator light 30 is provided to inform an operator that a warning condition exists on a sensed parameter that is not currently being indicated by a gauge. For example, if oil pressure was in the second group of parameters but the first group of parameters was currently being displayed, then the warning indicator light 30 would be illuminated if the oil pressure reached a warning level. Alternatively, the instrument could automatically switch to the group of parameters including the parameter having the warning condition.

Other than the warning indicator light 30, the indicator lights 14 indicate various system faults or warning conditions. In the preferred embodiment, one or more of the indicator lights 14 are associated with warning conditions of parameters indicated by the gauges 12.

In the preferred embodiment, the instrument 10 performs some processing of the sensor signals and scales the signals received from pulse-width modulation type sensors and frequency based sensors in a manner well-known in the art. The instrument 10 produces instrument signals identifying each sensed parameter and the level of the parameter being indicated by each sensor 16.

The electronic control 20 preferably sends control signals to the instrument 10 which identify each gauge and which cause the appropriate indicator lights to be illuminated, the appropriate segments on each gauge 12 to be illuminated to indicate the level of each sensed parameter in the group selected by the gauge selecting means 25, and the proper indications for the digital display 26 and the identification display 27.

In a preferred embodiment of the invention, the instrument 10 executes the algorithm illustrated in FIG. 2. The instrument 10 reads 32 the sensor signals from the wire harness 18. Since the sensor signals may be in the form of pulse-width modulated signals, frequency signals, or switch-type binary signals, the instrument 10 scales 34 the inputs to a microprocessor readable form in manners well-known in the art. For example, if the value of the parameter is to be represented by a binary signal having a range of values from 0–255 and a pulse-width modulated signal for a parameter is received having a 50% duty-cycle, the instrument 10 may assign the binary number 128 to that parameter if a linear characteristic is desired. In the preferred embodiment, the scaling associated with each parameter is varied in accordance with the desires of the system designers. The scaling may be linear, logarithmic, or any other desirable characteristic.

Similarly, the instrument 10 receives signals from the switch-type sensors and the gauge select means 24 and data select means 28. The data associated with these inputs are similar to the other types of sensors, but generally no scaling is required.

The instrument 10 then builds 36 an instrument signal for the communication link 22 with the scaled parameter data and the switch-type data, including the status of the gauge and data select means 24,28. In the preferred embodiment, a serial data series is built including a module identifier corresponding to the electronic control 20 to receive the data, an identifier for each scaled parameter to be transmitted over the communication link 22, the scaled data representing the level of the parameter associated with each identifier, and the status of the gauge and data select means 24,28. Once the instrument signal is built, the instrument 10 transmits 38 the message over the communication link 22.

In a preferred embodiment of the invention, the electronic control 20 executes the algorithm illustrated in FIG. 3. The electronic control 20 reads 40 the instrument signal off the communication link 22 and parses 42 the serial message into the individual pieces associated with each parameter.

The status of the gauge select means 24 determines which of the parameters are displayed on each of the gauges. Since in the preferred embodiment, there are more parameters to be displayed than the number of available gauges, only a portion of the parameters are displayed at any given time. In the preferred embodiment the gauge select means 24 is a toggle switch and the parameters to be displayed are divided into two groups. In response to the gauge selecting means 24 having one of two states, the electronic control 20 obtains display commands for the selected group of gauges 12.

For each parameter, the electronic control 20 then obtains 44 display commands in response to the parameter values, the data selecting means 28 status, and the gauge selecting means 24 status. In response to the scaled data from the pulse-width modulated and frequency sensors and the status of the gauge selecting means 24, the electronic control 20 determines which segments are to be illuminated on each gauge. In the preferred embodiment, the electronic control 20 includes a memory device (not shown) including a plurality of stored parameter values corresponding to the magnitude of the scaled data.

In accordance with the above example, suppose that the scaled data associated with the oil pressure in an engine is 128. The electronic control 20 retrieves the parameter value corresponding to 128 for oil pressure. For the purposes of this example, assume that the retrieved value is 100 kPa and that a predefined range of values for oil pressure has been chosen by the system designers to be 50–150 kPa. The electronic control 20 then uses an equation using the retrieved value, the predefined range, and the number of available segments to determine the number of segments to be illuminated to indicate an oil pressure of 100 kPa.

In the preferred embodiment, the equation is linear, however, the equation may be non-linear without deviation from the present invention. In the preferred embodiment, the solution to the equation is rounded up to obtain the proper number of segments to illuminate. In keeping with the example, if there are 11 segments that are available to be illuminated, the parameter value is 100 kPa and the range of values is 50–150 kPa, the solution to a linear equation would be 5.5 segments and by rounding up, the message to be sent to the instrument for oil pressure would indicate that 6 segments should be illuminated. Alternatively, a look-up table of a type well-known in the art may be used in place of the equation.

In addition, a message is created for turning on one of the gauge selection lights 25 in response to the status of the gauge select means 24. In the preferred embodiment, each of the gauge selection lights 25 are associated with a group of sensed parameters to provide the operator with an indication of which parameters are being displayed by the gauges 12.

Similarly, the status of the data selecting means 28 determines which of the parameters are displayed by the digital display 26. Since only one parameter may be displayed in digital form at any given time, the data selecting means 28 allows the operator to choose which parameter is displayed. In the preferred embodiment, there are a predefined number of parameters to be displayed that each have a numerical identifier to be displayed on the identification display 27. The parameters are arranged in a numerical order and each time the data selecting means 28 is activated the electronic control 20 changes the digitally displayed data to the next parameter in numerical order. Since the numerical identifier is displayed on the identification display 27, the operator is aware of which parameter is being displayed by the digital display 26. Thus the operator scrolls through the list of available parameters through activation of the data selecting means 28. Advantageously, a decal or card (not shown) indicating the parameters associated with each of the gauge selection lights 25 and the identifiers on the identification display 27 is located near the instrument 10 for easy reference by the operator.

In response to the switch-type inputs, the electronic control 20 determines whether and which indicator lights 14 should be illuminated in a manner well-known in the art. For example, if the data message associated with a particular switch-type input indicates that a switch-type sensor is in a warning or fault condition, the indicator light 14 associated with that sensor is illuminated. The electronic control 20 also typically performs other control functions, such as engine or transmission control functions, in response to the parameter values and switch-type inputs, but these functions form no part of the present invention and will not be further described herein.

In the preferred embodiment, if a warning condition exists on a gauge 12 not being currently displayed, the electronic control 20 produces a command to illuminate the warning indicator light 30. Thus, the operator is advised that he should change the status of the gauge selecting means 24 to indicate the parameter having the warning condition.

The electronic control 20 builds 46 a control signal that is a serial message including all of the relevant display information in a manner similar to that described above. The control signal includes a module identifier corresponding to the instrument 10, an output identifier for each display, i.e. gauge 12, digital display 26, identification display 27, indicator light 14, and gauge selection light 25, as well as the commands for each display to indicate the selected parameter levels and warning conditions. In addition, the control signal includes an indication of whether each gauge 12 should display the parameter in a center justified format, as selected by the system designer. The electronic control 20 then transmits 48 the control signal on the communication link 22.

In a preferred embodiment of the invention, the instrument 10 executes the algorithm illustrated in FIG. 4. The instrument 10 reads 50 the control signal off the communication link 22 and parses 52 the serial message into the individual pieces associated with each display.

In response to each message, the instrument 10 assigns each parameter 54 to a display in response to the output identifier for each piece of data parsed from the serial message. Each gauge is updated 56 to indicate the current parameter level in the desired format. If the signal received from the electronic control 20 includes a command to turn on one or both of the warning segments, then the instrument 10 will cause the appropriate segments to flash to indicate the warning condition. The digital display 26 is updated to indicate the level of the proper parameter and the identification display 27 is updated to indicate the proper numerical identifier. Each indicator light 14, the horn driver, and the alarm lamp driver are selectively energized or de-energized.

In the preferred embodiment, the communications described in connection with FIGS. 2, 3, and 4 occur approximately four times every second. It should be understood, however, that more or less frequent communications could be used.

Industrial Applicability

The operation of an embodiment of the present invention is best described in relation to its use on an engine or vehicle and in connection with an instrument for displaying operating conditions and an electronic control for controlling various engine or vehicle functions. The invention allows the electronic control to receive sensor information from the instrument via a serial communication link and to control the display of sensed parameters on the instrument.

In the preferred embodiment, sensor data representative of a plurality of parameter values is received by the instrument 10 via a wire harness 18. The instrument 10 scales and processes the signals to form instrument signals which are sent to the electronic control 20 in serial form over a communication link 22. The instrument signals include parameter identifiers along with the parameter values. The present invention therefore allows the electronic control 20 to receive a plurality of sensor signals over only a single input via the instrument 10.

The electronic control 20 uses the instrument signals to perform a variety of control functions. The particular control functions play no part in the instant invention and will not be further described. The electronic control 20 also uses the instrument signals to produce control signals which are delivered to the instrument 10 via the communication link 22. The control signals cause the segments of the gauges 12 to be illuminated in response to the level of the various sensed parameters, cause the indicator lights 14 to be illuminated in response to system faults or warning conditions, and cause the digital and identification displays 26,27 to indicate the proper values.

The gauge selecting means 24 is used by an operator to selectively display two sets of parameter values on the gauges. The gauge selecting means 24 delivers a signal to the instrument 10 which transmits a signal to the electronic control 20 identifying the desired group of parameters to be displayed. The operator can therefore toggle between the two groups of displayed parameters.

The data selecting means 28 is used by the operator to select a desired parameter to be indicated on the digital display 26. The data selecting means 28 delivers a signal to the instrument 10 which transmits a signal to the electronic control 20 identifying the parameter to be indicated on the digital display. The electronic control 20 responsively sends a signal to the instrument 10 to indicate the value and identity of the desired parameter on the digital and identification displays 26,27, respectively.

Any specific values used in the above descriptions should be viewed as exemplary only and not as limitations. Other aspects, objects, and advantages of this invention can be obtained from a study of the drawings, the disclosure, and the appended claims.

We claim:

1. An apparatus for receiving data and displaying a plurality of parameters, comprising:

a plurality of sensor means for producing sensor signals in response to sensed parameters;

an instrument means for receiving said sensor signals and responsively producing an instrument signal, said instrument means including one or more display means for indicating sensed parameter values; and a communication link connected to and between said instrument means and a control means for receiving said instrument signal via said communication link and responsively producing a control signal in response to said instrument signal; said instrument means receives said control signal and responsively indicates parameter values on said one or more display means.

2. An apparatus, as set forth in claim 1, wherein said sensor signals are greater in number than said one or more display means and including a warning indicator light and a gauge switching means for selectively indicating parameter values corresponding to each of said sensor signals on said one or more display means, said control means causing said warning indicator light to be illuminated in response to a warning condition existing for a parameter value not being indicated by one of said display means.

3. An apparatus, as set forth in claim 1, wherein said communication link is a two way communication link and carries said instrument signal from said instrument means to said control means and carries said control signal from said control means to said instrument means.

4. An apparatus, as set forth in claim 1, wherein said display means includes a plurality of gauges and including means for displaying in a digital format a level of the sensed parameter being indicated by said gauge and data switch means for selecting the gauge for which said level is displayed in digital format.

5. An apparatus for receiving data and displaying a plurality of parameters, comprising:
- a plurality of sensor means for producing sensor signals in response to sensed parameters;
- an instrument means for receiving said sensor signals and responsively producing an instrument signal, said instrument means including one or more display means for indicating the level of sensed parameters and said sensor signals being greater in number than said one or more display means;
- a control means for receiving said instrument signal and responsively producing a control signal;
- a communication link connected to and between said instrument means and control means;
- means for receiving said control signal and responsively indicating the level of the sensed parameters on said one or more display means; and
- gauge switching means for selecting a first group and a second group of parameter values to be indicated by said one or more display means.

6. An apparatus, as set forth in claim 5, wherein said display means includes a gauge and including means for displaying in a digital format a level of the sensed parameter being indicated by said gauge and data switch means for selecting the sensed parameter for which said level is displayed in digital format.

7. A method for receiving data and displaying a plurality of parameters, comprising the steps of:
- producing sensor signals in response to a plurality of sensed parameters;
- delivering the sensor signals to an instrument having one or more displays and responsively producing an instrument signal;
- delivering said instrument signal to a control via a communication link;
- producing a control signal in response to the instrument signal; and
- displaying a level of each of the plurality of sensed parameters in response to the control signal.

8. A method, as set forth in claim 7, wherein the sensor signals are greater in number than the displays and including the steps of selectively indicating parameter values of a first group and a second group of parameters and causing said warning indicator light to be illuminated in response to a warning condition existing for a parameter value not being indicated by one of said display means.

9. A method, as set forth in claim 7, wherein the displays include a plurality of gauges and including the steps of displaying in a digital format a level of the sensed parameter being indicated by one of the gauges and selecting the gauge for which said level is displayed in digital format.

* * * * *